United States Patent [19]

Rapp et al.

[11] 4,194,836

[45] Mar. 25, 1980

[54] PHOTOGRAPHIC COPYING MACHINE WITH CARRIER STRUCTURE CARRYING FORMAT MASKS TO AND AWAY FROM THE COPYING STATION

[75] Inventors: Heinz Rapp, Munich; Ernst Biedermann, Taufkirchen; Siegfried Bartel, Gauting, all of Fed. Rep. of Germany

[73] Assignee: AGFA-Gevaert, A.G., Leverkusen, Fed. Rep. of Germany

[21] Appl. No.: 927,520

[22] Filed: Jul. 24, 1978

[30] Foreign Application Priority Data

Jul. 29, 1977 [DE] Fed. Rep. of Germany ....... 2734324

[51] Int. Cl.² .............................................. G03B 27/62
[52] U.S. Cl. ........................................ 355/75; 354/15; 354/292
[58] Field of Search ........................... 354/292, 13, 15; 355/39, 40, 53, 54, 75, 76, 46

[56] References Cited

U.S. PATENT DOCUMENTS

| | | | |
|---|---|---|---|
| 2,384,019 | 9/1945 | Dye | 355/75 |
| 3,588,243 | 6/1971 | Osawa et al. | 355/40 |
| 3,677,146 | 7/1972 | Nielsen | 355/39 X |
| 4,027,968 | 6/1977 | Spence-Bate | 355/46 |

Primary Examiner—Richard A. Wintercorn
Attorney, Agent, or Firm—Michael J. Striker

[57] ABSTRACT

A rotary format-mask carrier plate carries a plurality of removably supported format masks for originals to be copied and carries them back and forth between the copying station and a change station, where the masks can be exchanged for others and/or copied originals replaced by not yet copied originals. Downwardly extending projections on the format masks extend through and beyond corresponding openings in the rotary carrier plate. While a format mask is transported from the change station to the copying station, it rests on the carrier plate. When it reaches the copying station, the carrier plate descends an amount such that the projections on the format mask come to rest on correspondingly arranged stationary electromagnets, thereby transferring the weight of the format mask to the stationary electromagnets. The carrier plate drops a further amount, losing physical contact with the format mask at the copying station. In this way, shaking or vibration of the format-mask carrier plate, resulting from laying on and removal of originals and format masks at the change station, cannot be transmitted to the format mask and original presently located at the copying station.

12 Claims, 3 Drawing Figures

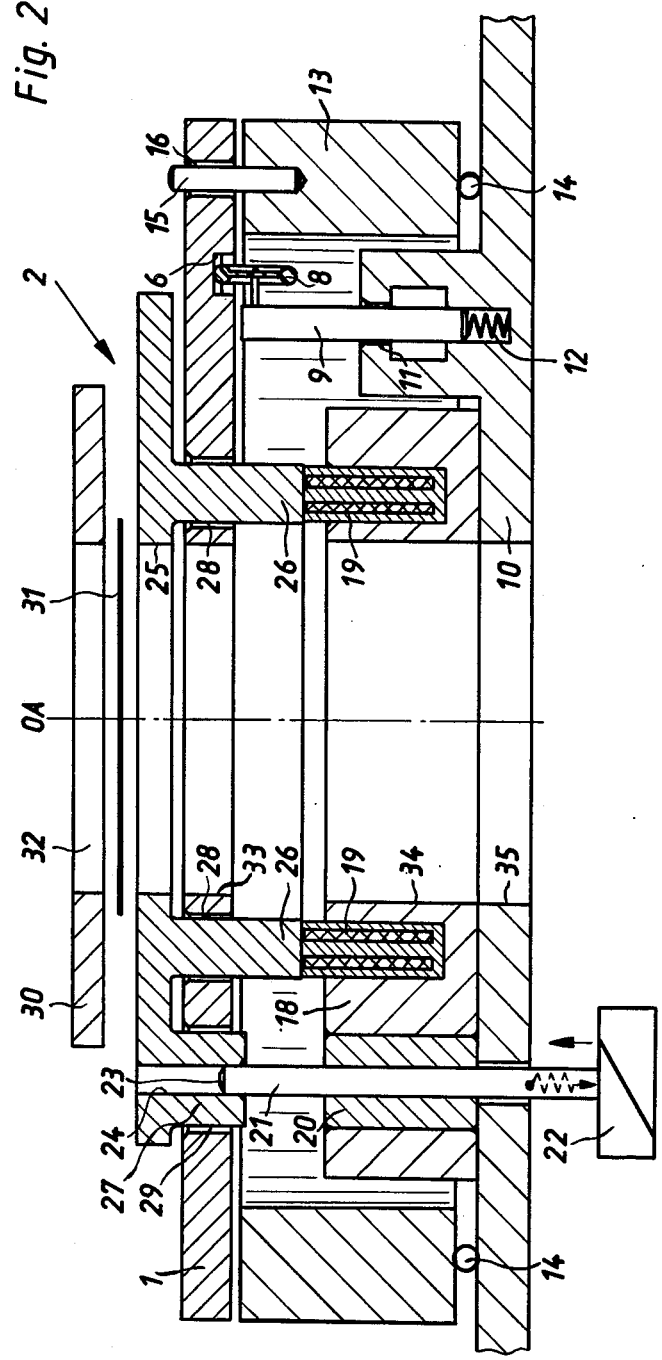

PHOTOGRAPHIC COPYING MACHINE WITH CARRIER STRUCTURE CARRYING FORMAT MASKS TO AND AWAY FROM THE COPYING STATION

BACKGROUND OF THE INVENTION

The present invention relates to photographic copying or printing machines of the type provided with exchangeable format masks for originals of differing format, the format masks and the originals masked by them being brought by a carrier structure into and then out of the copying station of the machine.

In photographic copying machines, it is known to provide a set of differing exchangeable original holders, in order to be able to copy originals of differing formats, or to produce from originals which are all of the same format enlarged copies of different portions of the originals. If it also known to lay originals to be copied on a rotary or slidable infeed table; in this way an original which has already been copied can be manually removed from one end of the table and replaced by another, while another original at the other end of the table is located at the copying station and being copied. Then the table is rotated or shifted, and the just copied original is moved to the change station where it can be replaced by another, whereas the original just laid onto the table at the change station moves to the copy station.

The disadvantage of this type of infeed system is that, when changing over to the next original at the change station, vibrations and the like, resulting from the operator removing an already copied original and laying down a yet to be copied original at the change station, can be transmitted via the infeed table to the original presently located and being copied at the copying station. Understandably, this leads to loss of image sharpness in the copies produced, especially in copying machines set up to produce enlargements having a width of up to 30 cm and more.

SUMMARY OF THE INVENTION

It is a general object of the invention to provide a photographic copying machine with an original infeed system of the type in question, but of such construction and operation that, even if such vibrations develop, they will not interfere with copying performed at the copying station.

In accordance with the invention, this is achieved as follows: Exchangeable, differing format masks are supported on a carrier which, for example, rotates or longitudinally reciprocates. The carrier brings one thusly supported format mask to the copying station, so that the original masked by such format mask can be copied, while another format mask is moved to the change station for replacement of an already copied original by a not yet copied original or for exchange of format masks. The format mask is supported by the carrier and physically contacts the carrier, as the format mask is moved from the change station to the copying station. However, when the format mask has reached the copying station, it is decoupled from the carrier and ceases to be in direct physical contact with the carrier. Accordingly, shaking or vibration of the carrier, resulting from the operator removing originals and/or masks at the change station, is not transmitted to the format mask and the original presently located at the copying station. Inasmuch as the format mask is disengaged from the carrier while at the copying station, precision-operation positioning and arresting means serve to keep the thusly disengaged format mask and its original in a precisely predetermined position during their stay at the copying station.

Because of the quick-exchange and exact-positioning capabilities of the inventive system, it is well suited for the exposing of pictorial and printed originals. The carrier can be a rotary table, a swinging table, or a longitudinally shifted support frame. The carrier will in general be provided with holding means for two or more masks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 2 is an enlarged-scale sectional view, taken along section line II—II of FIG. 1.

Figure 1:
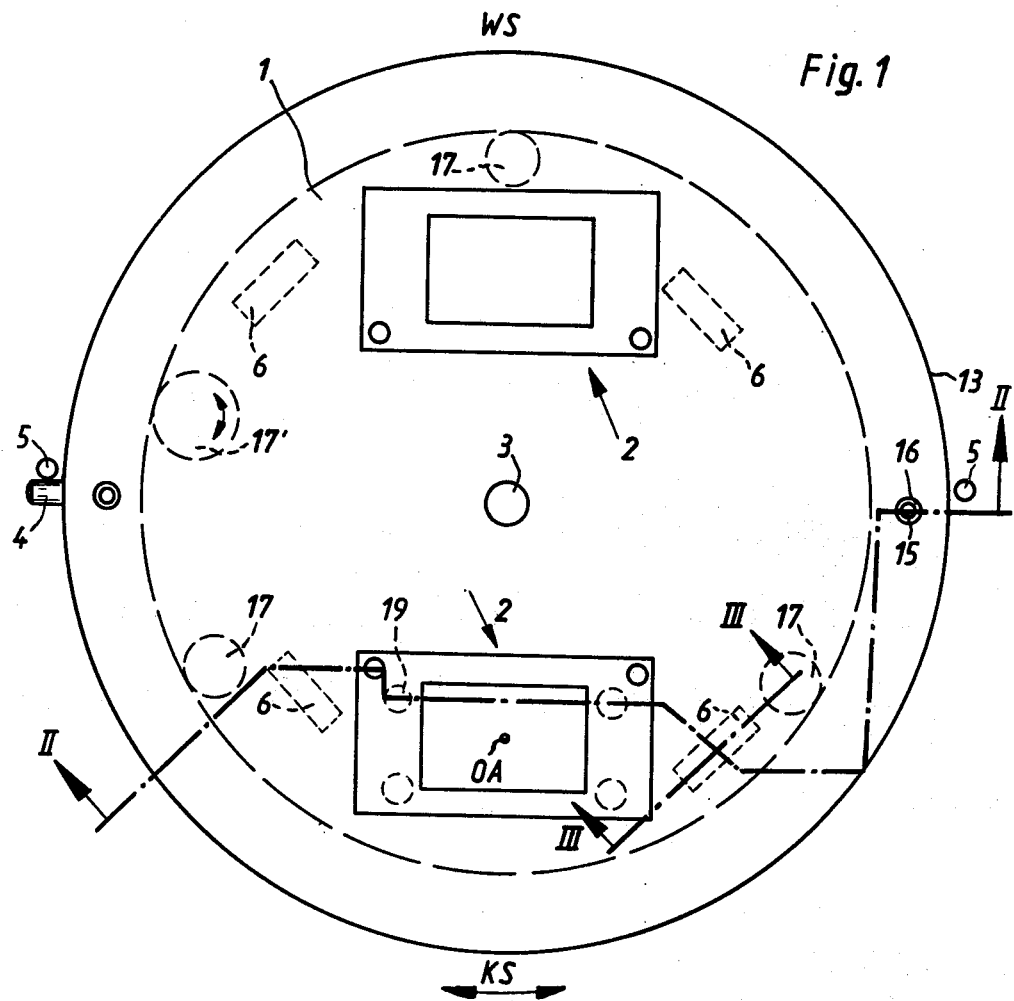
FIG. 1 is a top view looking down upon a carrier for format masks, the carrier here being a rotary table.

DESCRIPTION OF THE PREFERRED EMBODIMENTS:

In FIG. 1, numeral 1 denotes a rotary table, serving as a carrier for format masks 2. Carrier 1 is mounted for rotation about a central shaft 3. The underside of the carrier 1 is provided with stepped grooves 6 which, as explained further below, serve to change the vertical height of carrier 1.

Carrier 1 rides on small support wheels 8, of which one is shown in FIG. 2. The wheels 8 are rotatably mounted on vertical mounting elements 9. Each vertical mounting element 9 is received within a guide structure 11 provided on a stationary base plate 10 and is upwardly biased by a respective compression spring 12, i.e., to urge the rims of all support wheels 8 up into engagement with the underside of carrier 1. Beneath carrier 1 there is provided a transport ring 13 which is supported on base plate 10 by means of roller bearings 14. The transport ring 13 is provided at its upper face with coupling pins 15 which are received in bores 16 in carrier 1, the coupling pins 15 serving to transmit rotation from the motor-driven transport ring 13 to the carrier 1. Furthermore, the support ring 13 (see FIG. 1) is provided with a radially outward projection 4 which cooperates with two stationary stops 5. As shown in FIG. 1, at the inner periphery of transport ring 13, ring 13 is engaged by centering wheels 17 and a drive wheel 17'. The centering wheels 17 are rotatably mounted, e.g. on the base plate 10, and are equiangularly spaced about the inner periphery of ring 13, thereby serving to keep the transport ring 13 properly centered. The drive wheel 17', driven by a (non-illustrated) drive motor, rotates the transport ring 13 and thereby the carrier 1.

FIG. 2 is a section through the structure of FIG. 1, taken at the region of the copying station KS. At this region, there is provided on the stationary base plate 10 a support block 18, in which are embedded four electromagnets 19. The support block 18 furthermore accommodates two guide sleeves 20, in which are guided respective arresting pins 21. The arresting pins 21 constitute the armatures of lift electromagnets 22. When each electromagnet 22 is unenergized, a biasing spring pulls pin 21 downwards, but when electromagnet 22 is energized arresting pin 21 lifts up. The upper end of arresting pin 21 has a somewhat tapered centering portion 23, which engages in a centering bore 24 of the format mask 2 when magnet 22 is energized.

Each format mask 2 is essentially a flat plate provided with a cut-out or opening 25 whose shape and size determines the format involved. The format mask 26 has four downwardly extending projections 26 serving to seat the format mask 2 on the electromagnets 19 when the format mask 2 is at the copying station KS. The format mask 2 has two further downwardly extending projections 27, in which the centering bores 24 are formed. The projections 26, 27 of the format mask 2 engage in respective openings 28, 29 of the rotary carrier 1, these openings receiving such projections with a certain amount of play so that one such format mask 2 can be readily lifted off and removed from the rotary carrier 1 and a different one easily inserted in its place. Also, this small amount of play facilitates high-precision positioning of the format mask 2 when it reaches the copying station KS and is to be arrested in position, as described further below.

Provided on top of the format mask 2 is a press-down plate 30, secured to the format mask 2 by non-illustrated means, e.g., a hinge or the like. Press-down plate 30 is provided to clamp or at least firmly hold an original 31 between it and the upper surface of format mask 2. Press-down plate 30, rotary carrier 1, support block 18 and base plate 10 are provided with respective registering openings 32, 33, 34, 35, so that exposure light can be transmitted through the negative 31 along optical axis OA when such negative is in copying position at copying station KS.

Figure 3:
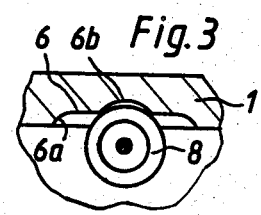
FIG. 3 is a sectional view, taken along section line III—III of FIG. 1.

FIG. 3 depicts in detail one support wheel 8, viewed at an angle of 90° relative to the depiction of such wheel in FIG. 2. In particular, FIG. 3 clearly shows the stepped groove 6 with which support wheel 8 cooperates. Stepped groove 6 comprises a first recess 6a having a length equal to from about two to about four times the diameter of support wheel 8, and having a depth equal to about half the amount by which rotary carrier 1 is to be raised and lowered, as explained further below. Midway in the longer first recess 6a is a second recess 6b, whose shape is exactly circular and exactly complementary to the periphery of support wheel 8. The depth of the first recess 6a is so chosen that, when the support wheel 8 falls into this recess 6a, the carrier 1 drops down an amount such that the downwards projections 26 of the format mask 2 come to rest on the electromagnets 19.

The arrangement depicted in FIGS. 1–3 operates as follows

At the change station WS of FIG. 1, the operator exchanges originals 31 and/or format masks 2. When this is done he presses a switch, or the like, which reverses the direction of the drive wheel 17', causing the drive force applied to carrier 1 to be now reversed in direction so that the carrier 1 commences to turn counterclockwise (as viewed in FIG. 1). Accordingly, the format mask and original at the change station WS move towards the copying station KS, whereas the format mask and copied original at the copying station KS move towards the change station WS. Somewhat before the stepped recesses 6 reach and are engaged by their cooperating support wheels 8, the operating speed of the drive wheel 17' is stepped down, by non-illustrated means. Shortly thereafter, each support wheel 8 reaches and enters into the first recess 6a of its cooperating stepped groove 6. Previous to this moment, the format masks 2 rested on the upper surface of rotary carrier 1, with the carrier 1 held lifted by the support wheels 8 at a height such that the downwards projections 26 of the thusly supported format masks 2 were at an elevation higher than the tops of the electromagnets 19. Now, the carrier 1 drops down, and the downwards projections 26 of the format mask 2 presently at copying station KS come to rest on the tops of electromagnets 19. At this point, the format mask 2 at copying station KS may, for example, still be in surface contact with the upper surface of the rotary carrier 1. As rotary carrier 1 turns a little further, the support wheels 8 enter into the second recesses 6b of the stepped grooves 6. As a result, rotary carrier 1 drops down a little further, and surface contact between the bottom surface of format mask 2 and the upper surface of carrier 1 is completely disestablished. At this point, the disengagement between rotary mask carrier 1 and the format mask 2 at copying station KS is complete. The supported weight of the format mask 2 has been transferred from the rotary carrier 1 to the stationary electromagnets 19 mounted on the stationary base plate 10, and there is no physical contact whatsoever between this format mask 2 and rotary mask carrier 1.

At this point, the outwards projection 4 on the transport ring 13 will have stopped against the opposite-side stop 5, i.e., the carrier 1 having turned through a half rotation. Preferably, the drive 17' is not switched off but continues in operation, so as to positively keep pressing projection 4 against stationary stop 5. This establishes a stable and well-defined end position for the rotary carrier 1 and thereby for the format mask 2. The lift magnets 22 are now energized, as a result of which arresting pins 21 rise and enter into the centering bores 24 in the format mask 2, thereby completely determining the position of the format mask 2 relative to the optical axis OA at the copying station KS. Then, the electromagnets 19 are energized, to firmly hold the format mask 2 in place.

Shaking or vibration of the rotary mask carrier 1, occurring for example as a result of manually laying on and removing originals and/or format masks at the change station WS, cannot be transmitted to the format mask 2 at copying station KS because of the complete decoupling of such mask 2 from carrier 1, the mask 2 being exclusively supported on the stationary base plate 10.

After the original at copying station KS has been copied, and perhaps an earlier copied original and/or its format mask replaced by another at change station WS, the lift electromagnets 22 are deenergized, as a result of which the arresting pins 21 retract out of the centering bores 24. Also, the electromagnets 19 are deenergized, so that the format mask 2 can be lifted again. Then the direction of operation of drive 17' is reversed, and the transport ring 13 turns now in the opposite direction, taking the rotary carrier 1 along with it due to the rotation-transmitting coupling pin 15. As soon as the rotary carrier 1 begins to turn it is lifted up, because the support wheels 8 roll out of the grooves 6 and begin to ride along the major bottom surface of carrier 1. Accordingly, the format mask 2 which was at the copying station KS now travels back to the change station WS once more resting on the upper surface of rotary carrier 1.

As shown in FIG. 1, the four stepped grooves 6 are not all spaced by equal radial distances from the rotation shaft 3 of rotary mask carrier 1. Instead, two diametrically opposite grooves 6 are equally spaced by one distance, and the other two diametrically opposed grooves 6 equally spaced by another radial distance. This prevents the carrier 1 from dropping down upon performance of a quarter-rotation.

The centering wheels 17, the drive wheel 17' and the support wheels 8 are preferably rubber wheels, in order to further reduce vibration.

In the illustrated embodiment the mask carrier 1 is essentially a flat, circular rotary plate. However, instead of being a rotary plate, it can equally be a longitudinally reciprocated plate. Likewise, it will be clear that the carrier need not have the form of a plate, but could instead be, for example, a skeletal holding-frame structure, or the like. Also, it will be clear that the carrier could support more than two format masks 2 at a time.

It will be understood that each of the elements described above, or two or more together, may also find a useful application in other types of constructions differing from the types described above.

While the invention has been illustrated and described as embodied in a carrier system for negatives and their format masks used in a photographic copying or printing machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it four various applications without omitting features, that from the standpoint of prior art, fairly constitute essential characteristics of the generic or specific aspects of this invention.

What is claimed as new and desired to be protected by Letters Patent is set forth in the appended claims.

1. In a photographic copying apparatus having a copying station, in combination, a format-mask carrier structure provided and normally in motion-transmitting engagement with a format mask; mounting means mounting the format-mask carrier structure for movement along a predetermined path for transporting the format mask to and then away from the copying station; decoupling means operative when the format mask has been carried to the copying station by the carrier structure for disestablishing the motion-transmitting engagement between the format mask and the format-mask carrier structure; and positioning means operative for causing the thusly disengaged format mask at the copying station to assume and retain a predetermined position relative to the copying station.

2. In an apparatus as defined in claim 1, the predetermined path being generally horizontal, the format mask resting with its own weight upon the format-mask carrier structure during transport of the format mask to and away from the copying station, the decoupling means comprising a stationary support structure located at the copying station and transfer means operative when the format mask has been carried to the copying station for causing the format mask to become vertically spaced and thereby physically disengaged from the format-mask carrier structure and for transferring the weight of the format mask to the stationary support structure.

3. In a photographic copying apparatus having a copying station, in combination, a format-mask carrier structure provided and normally in motion-transmitting engagement with a format mask; mounting means mounting the format-mask carrier structure for movement along a predetermined path for transporting the format mask to and then away from the copying station; decoupling means operative when the format mask has been carried to the copying station by the carrier structure for disestablishing the motion-transmitting engagement between the format mask and the format-mask carrier structure; and positioning means operative for causing the thusly disengaged format mask at the copying station to assume and retain a predetermined position relative to the copying station, the predetermined path being generally horizontal, the format mask resting with its own weight upon the format-mask carrier structure during transport of the format mask to and away from the copying station, the decoupling means comprising a stationary support structure located at the copying station and transfer means operative when the format mask has been carried to the copying station for causing the format mask to become vertically spaced and thereby physically disengaged from the format-mask carrier structure and for transferring the weight of the format mask to the stationary support structure, the transfer means comprising means operative when the format mask has been carried to the copying station for causing the format-mask carrier structure to drop down and thereby cease to support the format mask and for furthermore causing the weight of the format mask to be transferred to the stationary support structure.

4. In an apparatus as defined in claim 3, the mounting means including a plurality of support wheels supporting the underside of the format-mask carrier structure, the underside of the format-mask carrier structure being provided with a plurality of grooves so located that when the carrier structure brings the format mask to the copying station the support wheels enter into the grooves causing the format-mask carrier structure to drop down away from the format mask.

5. In an apparatus as defined in claim 4, the grooves being stepped grooves comprising a first and a deeper second recess such that when the support wheels enter into the first and then the second recesses the format-mask carrier structure drops down a first amount and then a second amount so as to transfer the weight of the format mask to the stationary support structure and drop out of contact with the format mask.

6. In an apparatus as defined in claim 1, the format mask being provided with centering bores, the positioning means comprising arresting means including arresting pins at the copying station operative for inserting the arresting pins into the centering bores to thereby properly position the disengaged format mask relative to the copying station.

7. In an apparatus as defined in claim 6, the arresting means comprising electromagnet means operative when activated for causing the arresting pins to enter into the centering bores, the arresting pins having tapered ends to facilitate entry into the centering bores.

8. In an apparatus as defined in claim 5, the format mask having projections extending downwardly through and beyond corresponding openings in the format-mask carrier structure, the depths of the first and second recesses being such that when the support wheels enter the first recesses the format-mask carrier structure drops down to such an extent that the downwardly extending projections of the format mask come to rest on the stationary support structure.

9. In an apparatus as defined in claim 8, the stationary support structure comprising a plurality of electromagnets, the downwardly extending projections of the format mask coming to rest on the electromagnets.

10. In an apparatus as defined in claim 3, the format-mask carrier structure being a rotary carrier structure, the mounting and decoupling means mounting the format-mask carrier structure for rotary movement to bring the format mask to and transport it away from the copying station and also for vertical movement to cause the format-mask carrier structure to drop down out of engagement with the format mask and lift up back into engagement with the format mask, and including an annular transport ring structure, reversible drive means rotating the transport ring structure, and a rotation-transmitting coupling element coupling the transport ring structure to the format-mask carrier structure to transmit rotation from the former to the latter.

11. In an apparatus as defined in claim 10, furthermore including a plurality of centering wheels mounted in a circle, the transport ring structure encircling the centering wheels, the inner periphery of the transport ring structure riding on the centering wheels.

12. In a photographic copying apparatus having a copying station, in combination, a format-mask carrier structure supporting and normally in motion-transmitting engagement with a format mask; mounting means mounting the format-mask carrier structure for movement along a predetermined path for transporting the format mask to and then away from the copying station; decoupling means operative when the format mask has been carried to the copying station by the carrier structure for disestablishing the motion-transmitting engagement between the format mask and the format-mask carrier structure; and positioning means operative for causing the thusly disengaged format mask at the copying station to assume and retain a predetermined position relative to the copying station.

* * * * *